Aug. 31, 1926.
L. G. BURT
1,597,761
MOLD
Filed Dec. 24, 1925
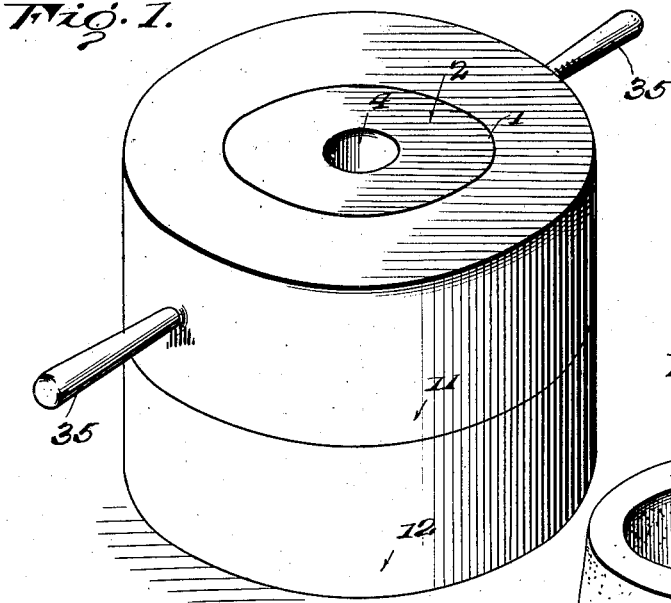
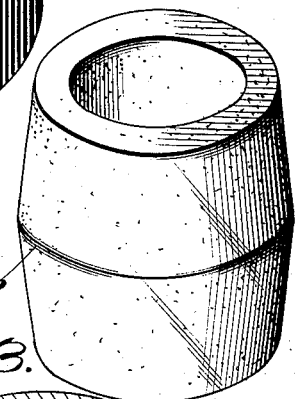
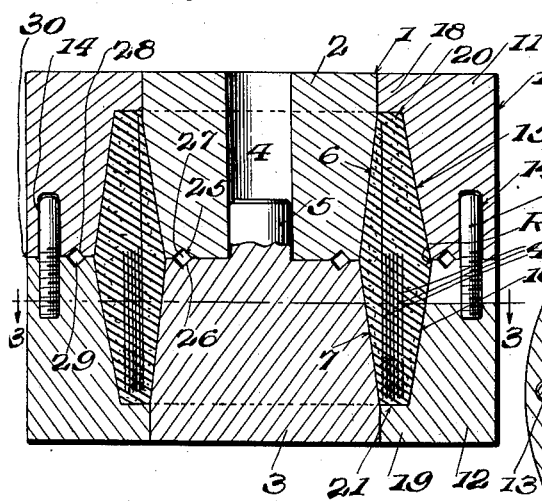
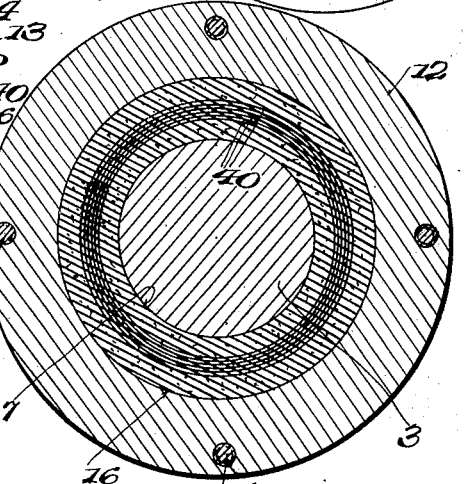
WITNESSES
W. A. Williams
INVENTOR
L. G. Burt.
BY
ATTORNEYS Patented Aug. 31, 1926.

1,597,761

UNITED STATES PATENT OFFICE.

LAWRENCE GLENN BURT, OF WHITTIER, CALIFORNIA.

MOLD.

Application filed December 24, 1925. Serial No. 77,542.

This invention relates to an improvement in molds especially adapted for use in the production of the packing rubbers employed on swabs and other well equipment.

The object of the invention is to provide a mold of this character which forms the rubber in such manner as to eliminate longitudinal rinds or ridges and to provide a rubber which is true circumferentially, thereby providing for a most effective packing or sealing and avoiding undue or uneven wear.

A further object is to provide a mold which may be easily assembled with as well as disassembled from the rubber to be formed and cured.

Another object is to provide a mold which has novel means for taking care of the excess material in the rubber packer that is being formed.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a perspective view showing a mold embodying the present invention,

Figure 2 is a view thereof in diametrical vertical section,

Figure 3 is a view in horizontal section on the line 3—3 of Figure 2, and

Figure 4 is a detail perspective view of the rubber or packer produced by the mold.

Referring to the drawings it will be seen that the mold embodying the present invention includes a two-part core, designated generally at 1, the core 1 including an upper part 2 and a lower part 3. The parts 2 and 3 are of circular form in cross section. The upper part 2 is provided with an axial opening 4, the lower end of which constitutes a socket for a dowel pin 5 which may be integral with or suitably connected to the lower part 3. The dowel pin 5 and socket 4 properly align the parts of the core. The part 2 has an annular and inwardly tapering wall 6 and the part 3 has an annular and inwardly tapering wall 7, the walls 6 and 7 tapering toward the center of the core; that is, toward the meeting faces of the parts 2 and 3, and constituting walls of the mold cavity. The mold proper is designated generally at 10 and includes an annular upper part 11 and an annular lower part 12, one of these parts, for example the lower part 12, having dowel pins 13 threaded or otherwise suitably connected thereto and adapted to fit in sockets 14 provided in the upper part 11, for properly aligning the parts 11 and 12 of the mold. The part 11 has an inclined wall 15 and the part 12 also has an inclined wall, also designated at 16, the walls 15 and 16 being opposite the inclination with respect to the walls 6 and 7. The walls 15 and 16 like the walls 6 and 7 are annular. Inwardly extending annular flanges 18 and 19 are provided on the parts 11 and 12 and provide the end walls 20 and 21 of the mold cavity.

In order to provide means for accommodating the excess material or rubber making up the rubber packers, the parts 2 and 3 of the core have complementary grooves 25 and 26 which co-act to define an annular material-receiving recess 27. For this same purpose the meeting faces of the parts 11 and 12 of the mold have complementary V-shaped grooves 28 and 29 which co-act to define the material-receiving recesses 30 of annular form.

Handles 35 may be provided on the part 11 of the mold to facilitate handling of the same.

In producing the rubber packers constituting the present invention the body of the rubber packer is made up to approximate form by building up the same from sheets of rubber and imbedded sheets of fiber (the fiber sheets being designated at 40), on a core or mandrel. After being built up to the approximate form the rubber is braced in the lower half of the mold cavity which is defined by the lower part 3 of the core and the lower part 12 of the mold. The upper part 2 of the core is then assembled with the lower part 3 of the mold. Afterwards the upper part 11 of the mold is placed over the upper portion of the rubber to be molded and in encircling relation to the upper part 2 of the core. These parts can be so assembled as to position the pins 13 in the sockets 14 and also the pin 5 in the socket 4. The entire device is then placed in a hydraulic press where it is subjected to the action of heat and pressure. The pressure causes the parts of the mold and core to come together, as shown in Figure 2, and the excess of material present in the rubber is expressed into the spaces 27 and 30 provided therefor. With a mold constructed in accordance with this invention there are no longitudinal ridges or rinds provided on the periphery of the core. A circumferential ridge or rind is formed around the central ridge R of the rubber, but this does not impair the efficiency of the rubber packer since it does not make it out of round.

I claim:—

1. A mold and core made up of a plurality of parts, said mold and said core having complementary grooves in their confronting faces defining recesses for receiving excess material from the mold cavity.

2. In combination, a core made up of two parts of circular form, the meeting faces of the parts of the core extending transversely to the longitudinal axis of the core, and a mold encircling the core and comprising a pair of parts of annular form and having meeting faces extending transversely of the longitudinal axis of the mold and core, the parts of the mold having at their outer ends inwardly directed flanges defining the end walls of the mold cavity.

3. In combination, a core made up of two parts of circular form, the meeting faces of the parts of the core extending transversely to the longitudinal axis of the core, a mold encircling the core and comprising a pair of parts of annular form and having meeting faces extending transversely of the longitudinal axis of the mold and core, the parts of the mold having at their outer ends inwardly directed flanges defining the end walls of the mold cavity, the meeting faces of the core having complementary grooves, the meeting faces of the mold also having complementary grooves.

4. A mold and core for use in forming packing rubbers for oil well swabs and comprising a core made up of two parts of circular form in cross section, the parts of the core having meeting faces located at the center of the core and mold and forming at the periphery of the core a line of meeting extending circumferentially around the core, the outer periphery of the core tapering outwardly from its center toward the ends of the core, a mold encircling the core and comprising a pair of parts of annular form and having meeting faces located at the center of the core and mold and defining a line of meeting around the inner periphery of the mold which extends circumferentially thereof, the inner periphery of the parts of the mold tapering inwardly from the center of the mold toward the ends thereof, and end walls for the mold cavity meeting the peripheral walls of the mold and core on lines extending circumferentially of the mold and core.

LAWRENCE GLENN BURT.